United States Patent
Tabellion (10) Patent No.: US 9,460,553 B2
(45) Date of Patent: Oct. 4, 2016

(54) POINT-BASED GLOBAL ILLUMINATION DIRECTIONAL IMPORTANCE MAPPING

(75) Inventor: Eric Tabellion, Belmont, CA (US)

(73) Assignee: DreamWorks Animation LLC, Glendale, CA (US)

( * ) Notice: Subject to any disclaimer, the term of this patent is extended or adjusted under 35 U.S.C. 154(b) by 426 days.

(21) Appl. No.: 13/526,452

(22) Filed: Jun. 18, 2012

(65) Prior Publication Data

US 2013/0335406 A1    Dec. 19, 2013

(51) Int. Cl.
  *G06T 15/00*   (2011.01)
  *G06T 17/00*   (2006.01)
  *G06T 15/50*   (2011.01)

(52) U.S. Cl.
  CPC ........... *G06T 17/005* (2013.01); *G06T 15/506* (2013.01); *G06T 15/00* (2013.01); *G06T 2210/56* (2013.01)

(58) Field of Classification Search
  USPC ......................................................... 345/426
  See application file for complete search history.

(56) References Cited

U.S. PATENT DOCUMENTS

| 8,207,968 B1* | 6/2012 | Krishnaswamy et al. | 345/426 |
| 2008/0001947 A1* | 1/2008 | Snyder et al. | 345/426 |
| 2008/0238919 A1* | 10/2008 | Pack | 345/420 |
| 2012/0007865 A1* | 1/2012 | Ha et al. | 345/426 |
| 2012/0019533 A1* | 1/2012 | Tabellion | 345/423 |

OTHER PUBLICATIONS

Donikian, M. , "Accurate direct illumination using iterative adaptive sampling", May 12, 2006, IEEE, vol. 12, pp. 353-364, [retrieved on Jul. 23, 2014]. Retrieved from the Internet<URL: http://ieeexplore.ieee.org/xpls/abs_all.jsp?arnumber=1608022&tag=1>.*

Agarwal, Sameer, "Structured Importance Sampling of Environment Maps", Jul. 2003, ACM, vol. 22, pp. 605-612, [retrieved on Jul. 23, 2014]. Retrieved from the Internet<URL: http://doi.acm.org/10.1145/882262.882314>.*

Tabellion, Eric,"An Approximate Global Illumination System for Computer Generated Films", Aug. 2004, ACM, vol. 23, pp. 469-476.[retrieved on Apr. 29, 2015]. Retrieved from the Internet: <URL:http://doi.acm.org/10.1145/1015706.1015748>.*

* cited by examiner

*Primary Examiner* — Barry Drennan
*Assistant Examiner* — Terrell Robinson
(74) *Attorney, Agent, or Firm* — Morrison and Foerster, LLP (57) ABSTRACT

Locations are shaded for use in rendering a computer-generated scene having one or more objects represented by the point cloud. A hierarchy for the point cloud is obtained. The point cloud includes a plurality of points. The hierarchy has a plurality of clusters of points of the point cloud. A location is selected to shade. A first cluster from the plurality of clusters is selected. The first cluster represents a first set of points in the point cloud. An importance weight for the first cluster is determined. A render-quality criterion for the first cluster is determined based on the importance weight. Whether the first cluster meets a render-quality criterion is determined based on a render-quality parameter for the first cluster. In response to the first cluster meeting the quality criterion, the location is shaded based on an indication of light emitted from the first cluster.

17 Claims, 10 Drawing Sheets

POINT-BASED GLOBAL ILLUMINATION DIRECTIONAL IMPORTANCE MAPPING

BACKGROUND

1. Field

The present disclosure relates generally to shading a computer-generated scene based on a point cloud representing objects in the scene and more specifically, to shading a computer-generated scene using directional importance mapping to improve efficiency.

2. Description of Related Art

Global illumination is a technique used in computer graphics to add more realistic lighting to a scene. One global illumination approach is known as the point-based global illumination (PBGI) approach. PBGI generally involves solving indirect illumination integrals and occlusion integrals. With PBGI, the directly illuminated objects in the scene are represented by a point cloud, which is generated in a pre-computation phase prior to the rendering of the scene.

A point cloud is a model that may be used to represent a surface and/or volume of an object using a set of points (which may also be called "emitter points"), with each point representing a position in three-dimensional space. In one example, an emitter point may be a data representation of a surfel, which is a small, disk-shaped surface element making up the different objects within a scene. In this example, the surfaces of different objects are subdivided into small micropolygons (or surfels), and the light energy emitting from each micropolygon (e.g., the radiance) is stored with each emitter point. An emitter point can also store other information, including a position, a surface normal, an effective area, a point-radius, and the like. The effective area and the point-radius stored in an emitter point are not the same thing; rather, they are two different representations of the size of the emitter point. The point-radius circumscribes the micropolygon that the emitter point represents. This ensures that the surfaces of the objects are completely covered by the emitter points with no gaps in between. The effective area is the area of the emitter point itself, which is typically smaller than the area corresponding to the point-radius.

To efficiently solve the illumination integrals with PBGI, the generated point cloud may be further organized into a multi-resolution level of detail hierarchy. For example, an octree data structure may be used to partition the three-dimensional space represented by a point cloud by recursively subdividing the space into eight octants. An octree data structure is a tree data structure wherein each internal node has up to eight child nodes. Leaf nodes in the octree store the individual emitter points of the point cloud. Each non-leaf node stores an emitter point cluster, which is an approximation of a collection of emitter points situated within a particular volume. For example, an emitter point cluster representation includes an average position for the emitter point cluster, as well as the projected area and emitted energy when the emitter point cluster is viewed from various directions (the directional projected area and directional emitted energy, respectively).

After generating the octree hierarchy, both the full point cloud and the octree hierarchy may then be used to compute the indirect illumination integrals and occlusion integrals at all "shading locations" (which may also be called "receiver points") seen from a virtual camera. However, not all nodes of the octree are necessary to compute the integrals at a particular shading location. For example, when an object is far away from a shading location in the scene, less refined nodes of the octree may be used to calculate the various integrals. When an object is close by, more refined nodes or even leaf nodes representing individual emitter points may be used. However, using more refined nodes to compute the integrals translates to longer shading time.

Rendered images used in high-quality motion pictures need to be photorealistic. One way to increase photorealism is to shade receiver points using emitter point clusters with higher levels of detail. However, using emitter point clusters with higher levels of detail necessarily requires using more emitter point clusters, which increases both rendering time and memory usage. Additionally, a level of detail that is suitable for one portion of the image may not be sufficient to provide acceptable quality for another portion of the image. Therefore, a technique is required that allows for the ability to define different acceptable levels of detail for different portions of the image.

BRIEF SUMMARY

In an embodiment of the invention, locations are shaded for use in rendering a computer-generated scene having one or more objects represented by the point cloud. A hierarchy for the point cloud is obtained. The point cloud includes a plurality of points. The hierarchy has a plurality of clusters of points of the point cloud. A location is selected to shade. A first cluster from the plurality of clusters is selected. The first cluster represents a first set of points in the point cloud. An importance weight for the first cluster is determined. A render-quality criterion for the first cluster is determined based on the importance weight. Whether the first cluster meets a render-quality criterion is determined based on a render-quality parameter for the first cluster. In response to the first cluster meeting the quality criterion, the location is shaded based on an indication of light emitted from the first cluster.

DESCRIPTION OF THE FIGURES

The present application can best be understood by reference to the following description taken in conjunction with the accompanying drawing figures, in which like parts may be referred to by like numerals.

DETAILED DESCRIPTION

The following description sets forth numerous specific configurations, parameters, and the like. It should be recognized, however, that such description is not intended as a limitation on the scope of the present invention, but is instead provided as a description of exemplary embodiments.

This disclosure describes processes for shading receiver points for use in rendering a computer-generated scene. In contrast to previous processes using PBGI techniques that relied on the user setting an acceptable level of detail for an entire scene (e.g., an upper limit on the solid angle of emitter point clusters used for shading receiver points), the processes described herein allow for more efficient shading of receiver points by allowing for the variation of the level of detail used to shade each receiver point.

Figure 1:
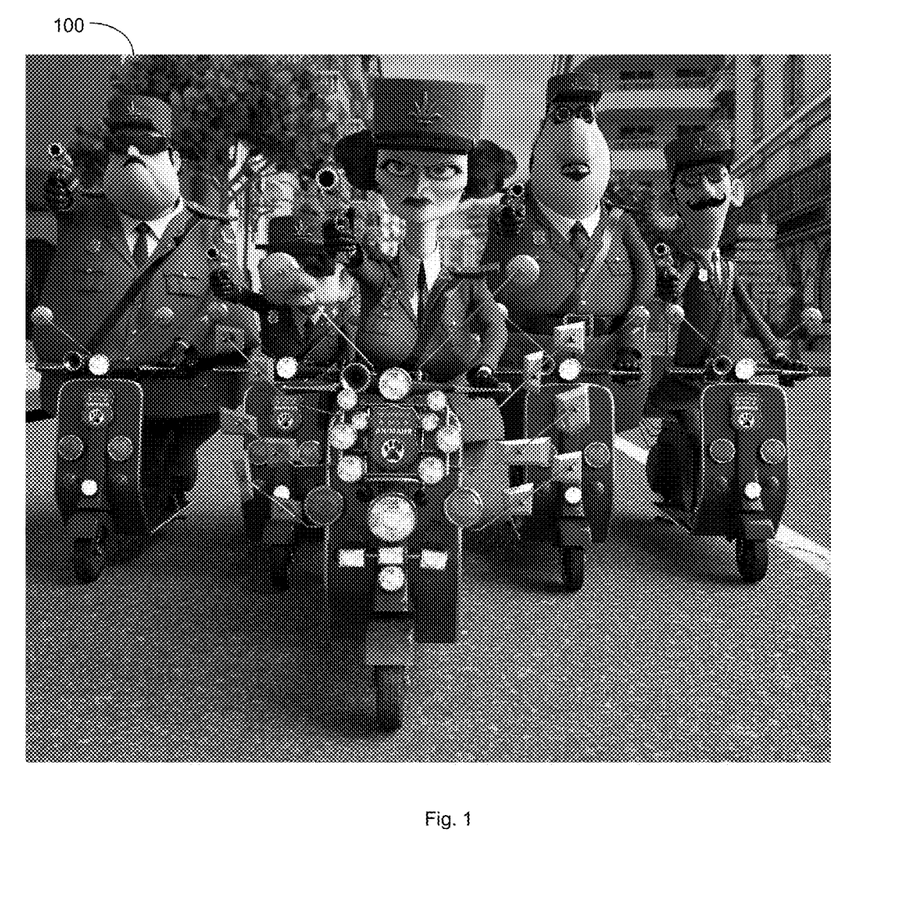
FIG. 1 depicts a scene using high-dynamic-range environment lighting that was rendered with an exemplary process according to the present disclosure.

FIG. 1 depicts scene 100 (from DreamWorks Animation movie "Madagascar 3: Europe's Most Wanted") rendered using an exemplary shading process, such as processes 300 or 900 (FIGS. 3 and 9, respectively) described below. Scene 100 includes high dynamic range environment lighting, meaning that the lighting of the scene includes directional spikes of illumination. Example sources of directional spikes of illumination include the sun, lightning bolts, explosions, and the like. By using an exemplary shading process according to aspects of the present disclosure, scene 100 was rendered in approximately one-third of the time that previous techniques took to render the same scene while maintaining a comparable level of quality.

Figure 2:
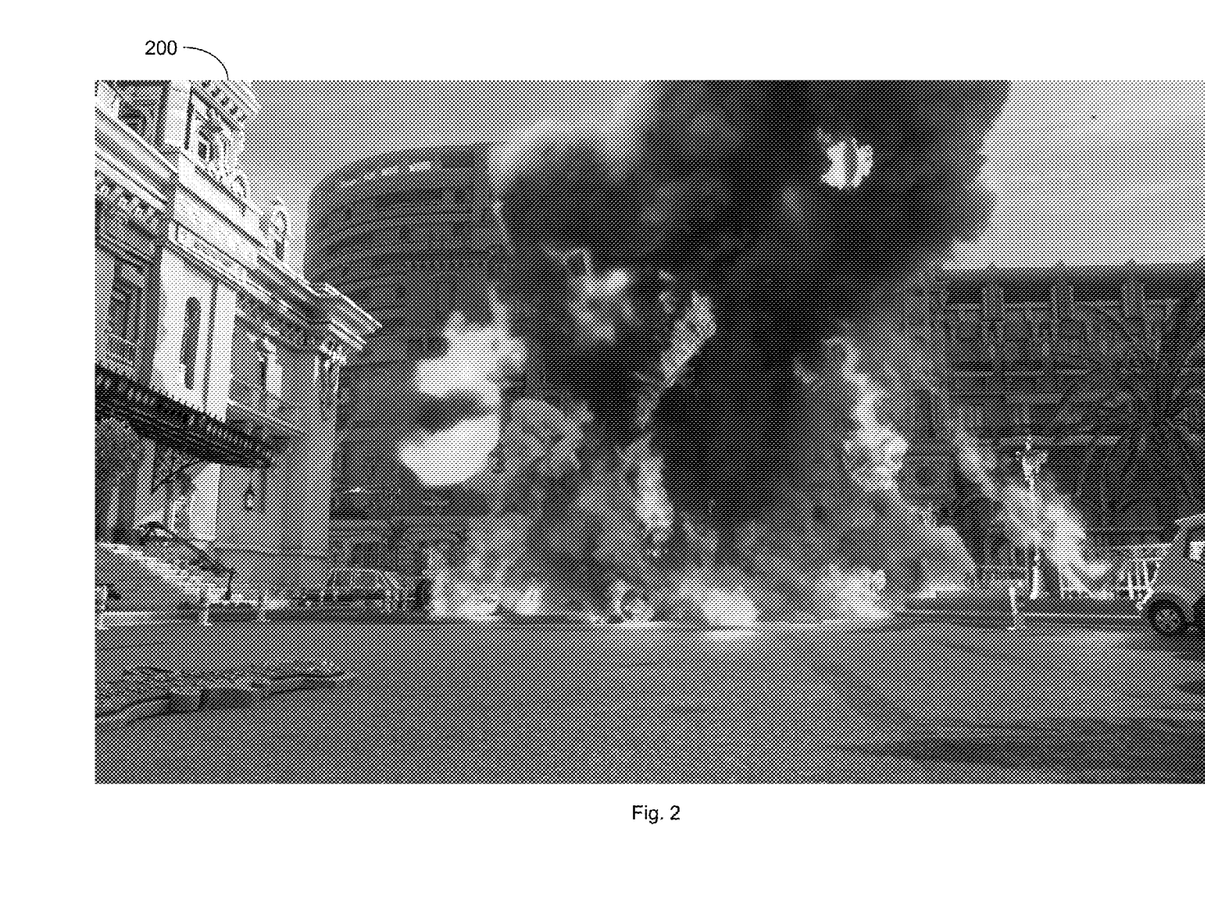
FIG. 2 depicts a scene that includes indirect diffuse and glossy reflections of the fire explosion that was rendered with an exemplary process according to the present disclosure.

FIG. 2 depicts scene 200 (also from the DreamWorks Animation movie "Madagascar 3: Europe's Most Wanted") rendered using the exemplary shading process. Scene 200 includes indirect diffuse and glossy reflections of the fire explosion. Examples of these reflections are illustrated by the reflections of the explosion on the street and the building. By using the exemplary rendering process, it was possible to render scene 200 at an acceptable quality level. In contrast, using only conventional techniques, the computational expense of scene 200 would have been high enough that it may have been impractical to use scene 200.

PBGI techniques typically accept a point cloud of emitter points as an input. The output of the PBGI techniques is applied to a set of receiver points that are used to shade a scene. Previous PBGI techniques have relied on the user setting an acceptable level of detail for all receiver points being shaded (e.g., an upper limit on the solid angle of emitter point clusters used for shading each receiver point used to render the scene). Some of these techniques allow for the use of larger emitter point cluster sizes (resulting in fewer emitter point clusters and less computing time overall) the further an emitter point cluster is from the receiver point that is being shaded. However, these techniques do not allow for changing the level of detail based on the importance of the cluster in shading the receiver point. An exemplary shading process is described below that allows for more efficient shading of receiver points by varying the level of detail for the emitter point clusters used to shade the receiver point based on the importance of the area of the scene in the direction of the emitter point cluster. For example, the importance of an emitter point cluster in shading a receiver point may be proportional to the luminance of the area of the scene in the direction of the emitter point cluster. As the luminance of the area of the scene increases, then the area can be represented by emitter point clusters with a higher level of detail when shading the receiver point.

The exemplary shading process described below relies on a point cloud for shading receiver points that are used in rendering the scene. The points of the point cloud may be called "emitter points" in that these points are emitting light that may affect the shading of the points that are being shaded, which may be called "receiver points."

Figure 3:
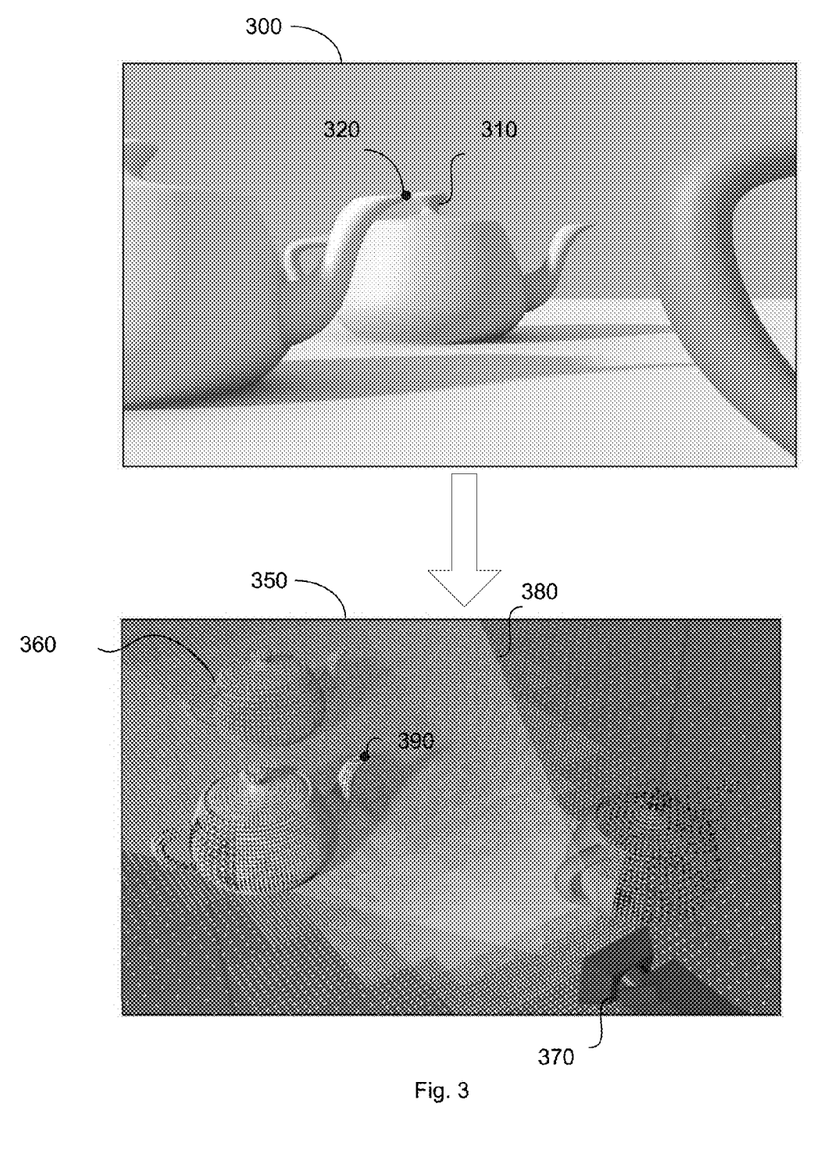
FIG. 3 depicts a scene and a point cloud representation of the scene.

FIG. 3 provides one example of a point cloud representation of objects that are rendered in a scene. Scene 300 may represent a shot taken by a virtual camera 370 viewing a virtual world of teapots, including teapot 310. A point cloud representation 360 of teapot 310 may be computed. To generate the point cloud, the surfaces of different objects in the scene 300, such as teapot 310, may be subdivided into small micropolygons. The energy (e.g., light) reflected (and/or emitted) from each micropolygon may be stored as an energy value in an emitter point associated with the micropolygon in the point cloud. An emitter point may also store other information, including a position, a surface normal, an effective area, a point-radius, or the like. Shading location 320 in the scene 300 may correspond to receiver point 390 in the point cloud representation 350 of the scene 300. Note that in this case, receiver point 390 may also be in the point cloud as an emitter point. However, this may not always be the case.

The point cloud may be generated from the point of view of virtual camera 370. This limits the number of emitter points to those visible by the camera, removing any emitter points outside the camera's field of view (outside of frustum 380) or occluded by other objects within the scene. However, in other cases it may be necessary to include emitter points that are not visible by the camera. The point cloud representation 350 of the scene 300 may be generated in a pre-computation phase before computing the shading of the receiver points for use in shading the scene.

The emitter points of point cloud representation 350 may be used to iteratively shade the receiver points necessary for rendering (e.g., shade) the pixels of scene 300. For example, the projections of the receiver points in-view may be mapped through the camera projection onto the rendered image plane to form scene 300. The distribution of receiver points may be generated so that once the receiver points are projected through the camera projection onto the rendered image plane, the receiver points are approximately pixel-sized and pixel-spaced.

Further discussion of point clouds and how point clouds may be used to render images may be found in U.S. patent application Ser. No. 12/842,986, filed Jul. 23, 2010, and entitled "Optimal Point Density Using Camera Proximity for Point-Based Global Illumination" and U.S. patent application Ser. No. 13/156,213, filed Jun. 8, 2011, and entitled "Coherent Out-of-Core Point-Based Global Illumination" (hereinafter "Coherent OOC PBGI"), each of which is herein incorporated by reference in its entirety.

The point cloud used for the exemplary processes described below may be shaded prior to shading the receiver points necessary to render a scene. For example, initially, a point cloud may be shaded using only direct illumination. Next, based on the directly illuminated point cloud, the point cloud (or a different point cloud representing the same virtual world) may be reshaded (e.g., using an exemplary process described below) to account for a single bounce of indirect illumination. This process may be repeated as necessary to create point clouds with an arbitrary number of bounces of light. Once a properly shaded point cloud is obtained, the exemplary process as described below may be used to shade a set of receiver points for use in rendering the scene. It should be understood that the receiver points that are shaded may or may not be represented in the point cloud of emitter points. In other words, a receiver point may also be an emitter point, but a receiver point may also not have a corresponding emitter point.

Figure 4:
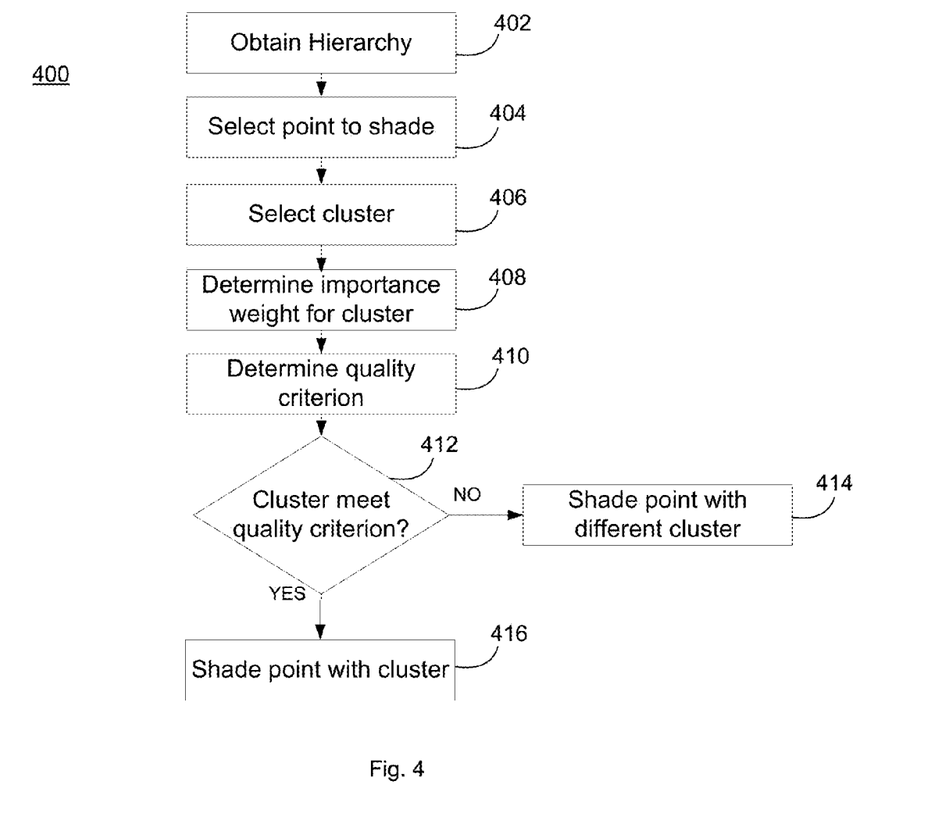
FIG. 4 depicts an exemplary process according to the present disclosure for shading receiver points based on importance mapping for use in rendering a computer-generated scene.

FIG. 4 depicts a flow chart for an exemplary shading process 400 for shading a receiver point for use in rendering a computer-generated scene based on a point cloud representing objects in the scene.

In block 402, a hierarchy for the point cloud may be obtained. In one example, block 402 may be accomplished by loading the hierarchy from memory. As one alternative for obtaining the hierarchy, a point cloud may be obtained (e.g., loaded from memory or generated for a scene) and the hierarchy is then generated from the point cloud. One example technique for generating a hierarchy from a point cloud may be found in Coherent OOC PBGI.

Example hierarchies include octrees, quadtrees, other tree structures, and the like. It should also be understood that non-tree based hierarchies could also be used as long as the hierarchy represents varying levels of detail of the point cloud. As mentioned above, in the hierarchy, an emitter point cluster is a grouping of emitter points that enables varying level of detail to be represented. The more emitter points that the emitter point cluster represents, the lower level of detail associated with the emitter point cluster.

Figure 5:
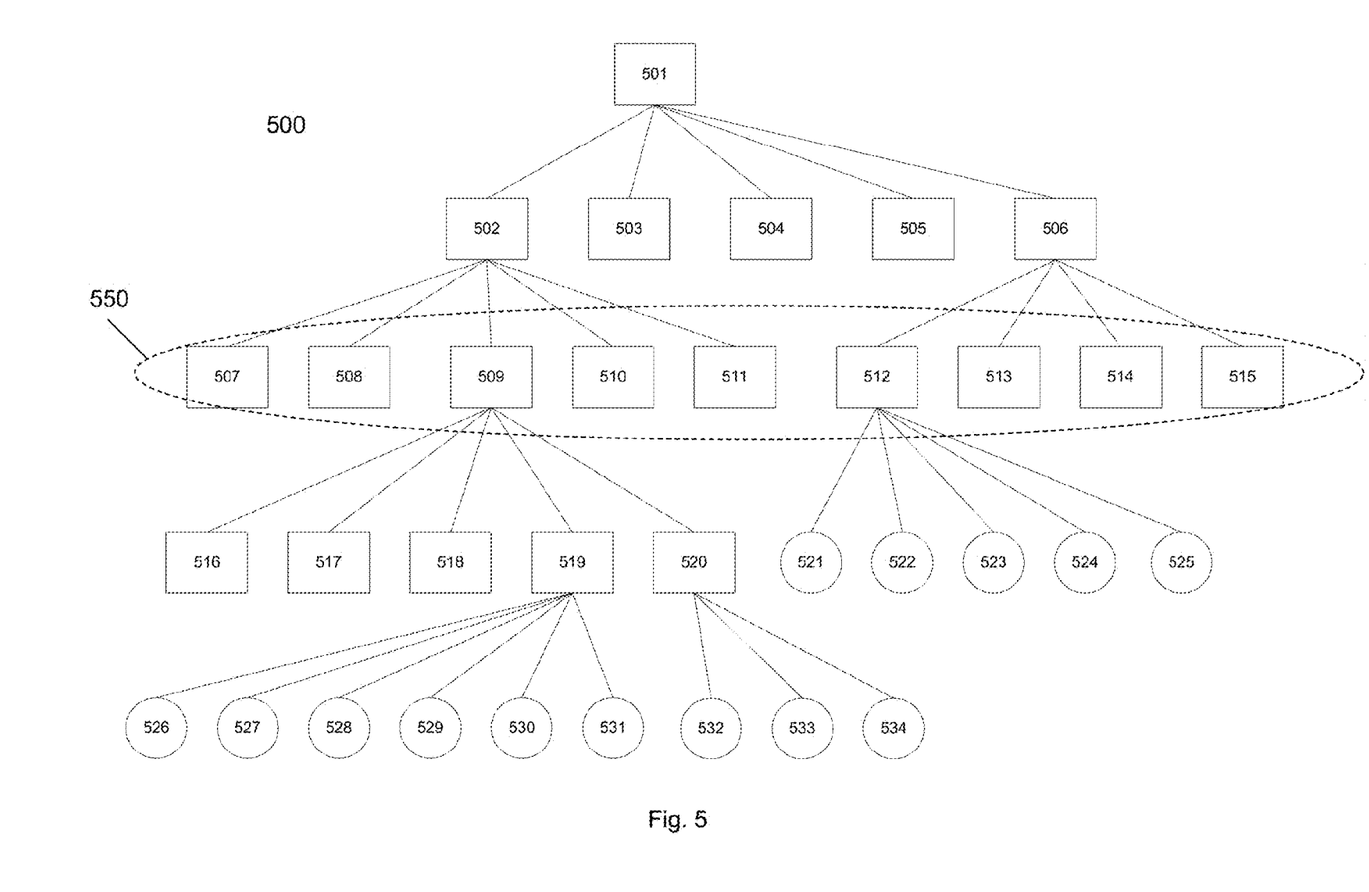
FIG. 5 depicts an example tree that may be used with exemplary processes according to the present disclosure.

FIG. 5 depicts an example hierarchy, tree 500 that can be obtained in block 402. Tree 500 represents a point cloud for objects of a scene. Leaf nodes 521-534 represent discrete emitter points in the point cloud. Internal nodes 501-520 each represent an emitter point cluster representing emitter points of the point cloud. For example, internal node 512 represents an emitter point cluster that includes the emitter points represented by leaf nodes 521-525; internal node 509 represents an emitter point cluster that includes the emitter points represented by leaf nodes 526-534; internal node 519 represents an emitter point cluster that includes the emitter points represented by leaf nodes 526-531; and internal node 520 represents an emitter point cluster that includes the emitter points represented by leaf nodes 532-534. Note that for clarity in FIG. 5, some internal nodes (e.g., internal nodes 503-505) are not shown as having any child nodes or descendent leaf nodes. However, it should be understood that all of the internal nodes in tree 500 have descendent nodes that include leaf nodes representing emitter points of the point cloud.

Each emitter point cluster represented by an internal node of tree 500 includes information associated with the emitter point cluster that may be relevant to shading and otherwise rendering the scene. For example, the emitter point cluster represented by internal node 520 may include an average position of the emitter point cluster, the projected area of the emitter point cluster, emitted energy of the emitter point cluster as a function of view direction, the direction normal to the emitter cluster, and the like. The emitter point cluster information may be based on averages or other functions that take into account information for emitter points that are included in the emitter point cluster.

Notably, the deeper/lower nodes of tree 500 have higher levels of detail because the deeper nodes are accounting for the information of fewer and fewer emitter points. For example, the emitter point cluster associated with node 520 only accounts for information from the emitter points associated with leaf nodes 532-534. In contrast, the emitter point cluster associated with node 509 accounts for the emitter points associated with leaf nodes 526-534 and any emitter points associated with leaf nodes of nodes 516-518. Accordingly, because the emitter point cluster associated with leaf node 509 is accounting for fewer emitter points, that emitter point cluster has a higher level of detail as compared to the emitter point cluster associated with node 509.

Referring back to FIG. 4, in block 404, a shading location (e.g., an unshaded receiver point in the set of receiver points to be shaded) is selected for shading. In one example, the shading location is a receiver point that may be selected from the set of all receiver points that are to be used in rendering a scene. While the set of receiver points to be shaded may be the same as the set of emitter points in the point cloud, this is not required. In one instance, the emitter points in the point cloud may correspond to a coarser distribution of points as compared to the set of receiver points to be shaded. Referring back to FIG. 5, if tree 500 is a hierarchy for a point cloud to be shaded, the emitter point represented by leaf-node 521 may be selected as the receiver point for shading. However, it should be understood that the receiver point selected for shading need not be in the point cloud or be an emitter point.

Figure 6:
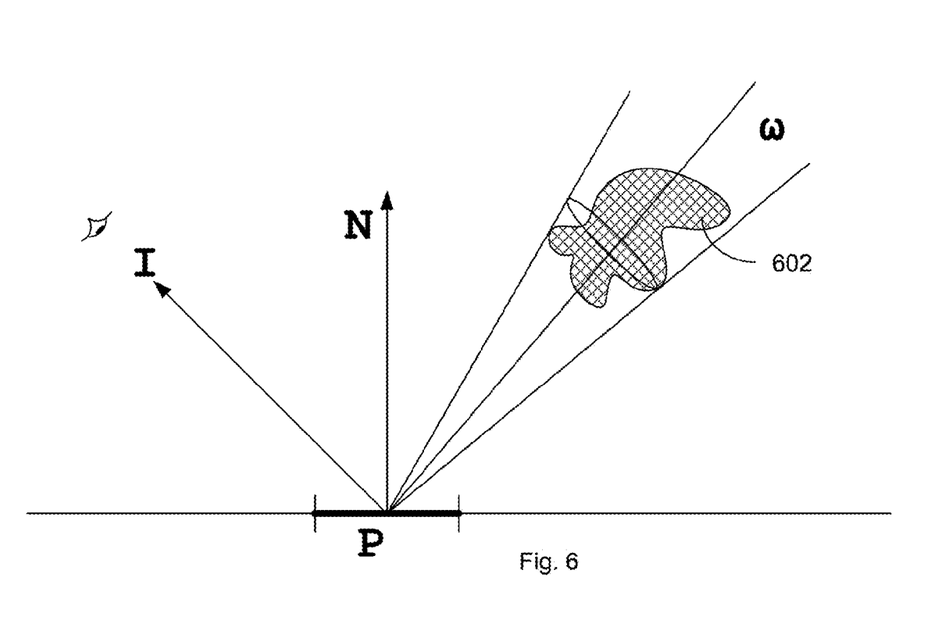
FIG. 6 depicts a solid angle that subtends an emitter point cluster with respect to a micropolygon.

Referring again to FIG. 4, in block 406, an emitter point cluster in the hierarchy is selected as possibly being relevant to shading the receiver point selected in block 404. In one example, the selected emitter point cluster may be selected based on a suitable level of detail (also called a "cut"). For instance, the suitable level of detail may be set by defining a desired solid angle for emitter point clusters. FIG. 6 depicts a solid angle w that subtends emitter point cluster 602 as viewed from a receiver point representing micropolygon P. The solid angle w may be approximated by the projected area of cluster 602 divided by the squared distance to emitter point cluster 602. If solid angle w is greater than the desired solid angle, then a cluster with a higher level of detail (e.g., deeper in the tree) should be used.

Once a suitable level of detail has been defined, the hierarchy obtained in block 402 (FIG. 4) can be parsed to find an emitter point cluster that has the lowest level of detail while still meeting the suitable level of detail. For example, the emitter point cluster associated with the node 509 (FIG. 5) may be an emitter point cluster with the lowest level of detail that still meets the suitable level of detail. Emitter point clusters associated with nodes above node 509 (e.g., nodes 501 and 502) will not meet the suitable level of detail. Emitter point clusters associated with nodes below node 509 (e.g., nodes 516-520) will meet the suitable level of detail, but may unnecessarily increase computing costs by using a level of detail beyond the cut that improves the quality beyond the desired level.

Referring back to FIG. 4, in block 408, an importance weight for the emitter point cluster selected in block 406 is determined. The importance weight may be based on a property associated with the emitter point cluster. For example, when rendering scenes with high dynamic ranges (HDR), emitter point clusters in directions of high luminance areas of the scene may be more important in shading the receiver point. In particular, proper shading for shadows from these high luminance directions may require a greater level of detail for emitter point clusters in the direction of high luminance, which may be themselves casting the shadow. Accordingly, an emitter point cluster in the direction of an area of the scene with a high luminance may have a higher importance weight that is proportional to the luminance of the area of the scene.

Figure 7:
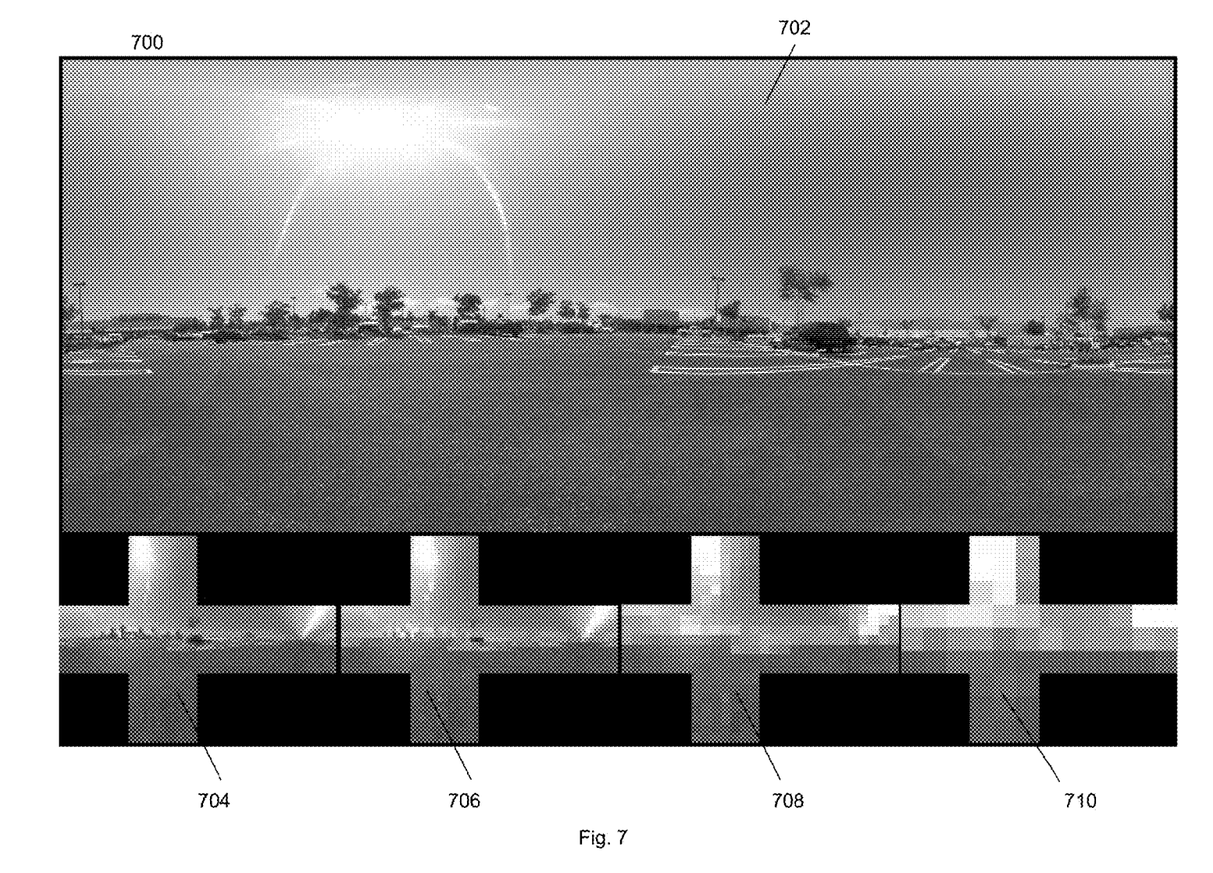
FIG. 7 depicts an environmental map and its associated mip-mapped importance cube-map.

To determine the luminance for an area of the scene in the direction of an emitter point cluster, a pre-computed mip-mapped importance cube map may be created, which in some cases may be a fish-eye view of the scene as viewed from the receiver point. An example of this map is depicted in FIG. 7, which includes environmental map 702 and mip-mapped importance cube-map represented by maps 704, 706, 708, and 710. Non-cube based maps (e.g. hemi-spherical) could also be used. The importance maps have pixel values set proportionally to the luminance in environment map 702. Each pixel, which represents a grouping of pixels of environmental map 702, in the lower resolution importance maps may have a luminance value that is the maximum luminance of any pixel in the grouping. This effectively dilates importance directionally and prevents missing important directions, especially early in the recursion, high up in the hierarchy. The highest mip-map level resolution (in map 704) is the same resolution as the cube-map rasterizer.

In another example, the importance weight may be based on the quality of the reflection of the receiver point in the direction of the emitter point cluster. In the case of sharper reflections (as opposed to glossy reflections), emitter point clusters with higher levels of detail may be needed to prevent blocky artifacts. Accordingly, the importance weight may be set to indicate that the emitter point cluster is important in shading the receiver point when the receiver point has a glossy reflection in the direction of the emitter point cluster.

Figure 8:
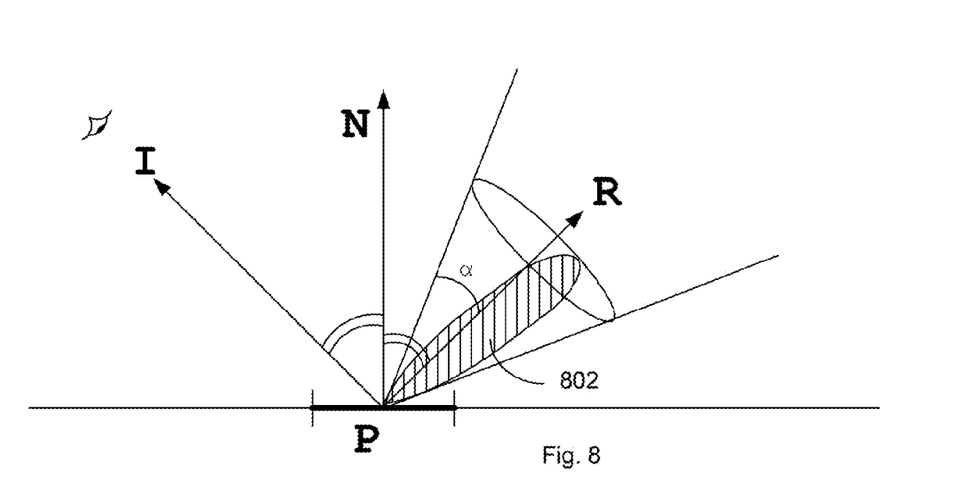
FIG. 8 depicts a bi-directional reflectance distribution function (BRDF) lobe bounding cone of directions.

A bi-directional reflectance distribution function (BRDF) lobe may be useful in accounting for the type of reflection in the direction of an emitter point cluster. FIG. 8 depicts a representation of the determination of the reflectance at a receiver point representing micropolygon P, which has a normal N, in a direction R towards the emitter point cluster. BRDF lobe 802 represents the reflectance of the receiver point; the wider the lobe, the more the glossy the reflection and the narrower the lobe, the sharper the reflection. When an emitter point cluster's subtended solid angle intersects the BRDF lobe's bounding cone of directions, which has a half-angle of α in FIG. 8, then the emitter point cluster receives a higher importance weight. One technique for determining an importance weight for such an emitter point cluster is to set the importance weight to be inversely proportional to the BRDF lobe bounding cone half-angle. Thus, in this example, a narrower BRDF lobe (meaning a sharper reflection) allows a narrower bounding cone and smaller half-angle, which results in a higher importance weight for the emitter point cluster. Glossy reflections result in a wider BRDF lobe, which, in this example, produces a lower importance weight for an emitter point cluster. Also in this example, diffuse reflections result in the widest BRDF lobes and produce the lowest importance weight for an emitter point cluster.

While two properties (luminance and reflectance) that may affect the importance weight have been described, it should be understood that other factors could also affect the importance weight. For example, a user could manually set the importance weight or set a factor that affects the importance weight for certain parts of the scene. As another example, a user could assign importance to specific objects in a scene.

In other examples, the importance weight may be based on multiple factors and/or parameters, such as the luminance in the direction of the emitter point cluster and the directional reflectance of the receiver point in the direction of the emitter point cluster. Other combinations of factors and parameters could also be used.

Referring back to FIG. 4, in block 410, a render-quality criterion for the emitter point cluster is determined based on the importance weight for the emitter point cluster. In one example, the render-quality criterion is a maximum solid angle required to subtend the emitter point cluster from the receiver point to be shaded. The maximum solid angle may be calculated based on a function of the importance weight. For instance, the function may be a linear interpolation of the smallest solid angle for any emitter point in the point cloud and the largest solid angle allowed, as set by the user. In another instance, the function may be a linear interpolation of the smallest solid angle for any pixel in the cube-map rasterizer in FIG. 7 and the largest solid angle allowed, as set by the user. In the case where luminance is used as the importance weight, the smallest maximum solid angle may be assigned to the highest luminance in the scene while the largest maximum solid angle allowed may be assigned to the lowest luminance in the scene. A luminance in between the highest and lowest luminance may be assigned a maximum solid angle that is a linear interpolation between the smallest and largest solid angles. However, it should be understood that other functions could be used to determine the solid angle based on the importance weight. Additionally, other parameters besides the maximum solid angle could form the basis for the render-quality criterion.

In block 412, it is determined whether the emitter point cluster satisfies the render-quality criterion from block 410. In the example above using a maximum solid angle as the render-quality criterion, the solid angle from the receiver point that subtends the emitter point cluster is compared to the calculated maximum solid angle. If the solid angle for the emitter point cluster is less than the calculated maximum solid angle, then, in block 416, the emitter point cluster may be used to shade the receiver point. On the other hand, if the solid angle for the emitter point cluster is greater than the calculated maximum solid angle, then, in block 414, a different emitter point cluster with a greater level of detail that represents a subset of the emitter points in the emitter point cluster from block 406 (e.g., an emitter point cluster lower in the hierarchy or deeper in the tree) is used to shade the receiver point.

For instance, referring back to FIG. 5, if the emitter point cluster represented by node 509 failed the render-quality criterion, then an emitter point cluster below node 509 having a higher level of detail (e.g., node 519) would be used to shade the receiver point selected in block 404 (e.g., the point represented by leaf-node 521). It should be understood that in this instance, other nodes (e.g., 516-518 and 520) may also have to be used in shading the receiver point. In another example, where an emitter point cluster fails the render-quality criterion and has no children emitter point clusters (i.e., the node that represents the emitter point cluster only has children that are leaf-nodes), then the emitter points of the emitter point cluster may be used in shading the receiver point. It should also be understood that the exact emitter point cluster to be used in shading the receiver point may be determined by iteratively parsing the tree with the blocks of process 400 until emitter point clusters are found that pass the render-quality criterion. The set of emitter point clusters (and possibly emitter points) that pass the render-quality criterion and are used for shading the receiver point may be called the "cut."

Figure 9:
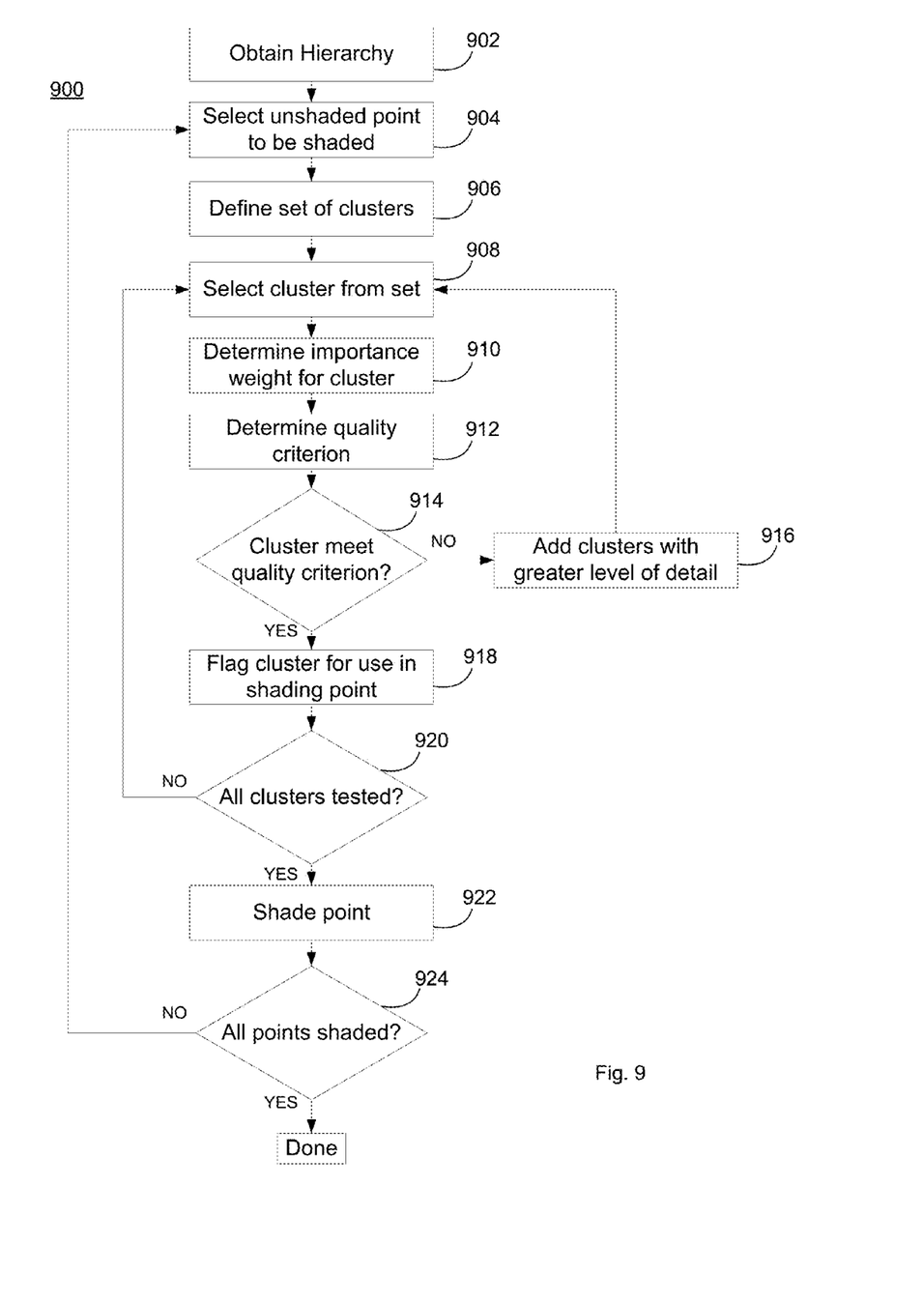
FIG. 9 depicts an exemplary process according to the present invention for iteratively shading receiver points based on importance mapping for use in rendering a computer-generated scene.

FIG. 9 depicts a flow chart for an exemplary shading process 900 similar to process 400 that additionally iterates through the receiver points to be shaded and through the hierarchy to determine the proper emitter point clusters to be used for shading each receiver point.

In block 902, a hierarchy for the point cloud may be obtained. Block 902 may be performed in the same manner as block 402. For example, the hierarchy may be tree 500 (FIG. 5).

In block 904, a shading location (e.g., an unshaded receiver point in the set of receiver points to be shaded) is selected for shading. In one example, block 904 is performed in a similar manner as block 404 (FIG. 4) discussed above. As discussed below with respect to block 924, block 904 may be iteratively repeated until all shading locations (e.g., receiver points in this example) that require shading have been shaded.

In block 906, a set of emitter point clusters in the hierarchy are selected as possibly being relevant to shading the receiver point selected in block 904. Similar to block 406 (FIG. 4), in one example, the initial set of emitter point clusters may be selected based on a suitable level of detail (a "cut"). For instance, as described with respect to block 406, the suitable level of detail may be set by defining a desired solid angle for emitter point clusters.

Once a suitable level of detail has been defined, the hierarchy obtained in block 902 can be parsed to find a set of emitter point clusters that represents the point cloud with the lowest level of detail that still meets the suitable level of detail. For example, the emitter point clusters associated with the nodes inside of ellipse 550 (FIG. 5) may be the emitter point clusters with the lowest level of detail that still meet the suitable level of detail. Emitter point clusters associated with nodes above these nodes will not meet the suitable level of detail. Emitter point clusters associated with nodes below these nodes will meet the suitable level of detail, but may unnecessarily increase computing costs by using a level of detail that improves the quality beyond the desired level. It should also be understood that each emitter point in the point cloud should be represented no more than once in the set of emitter point clusters.

In block 908, a emitter point cluster is selected and removed from the set of emitter point clusters defined in block 906 to determine its importance in shading the reciver point from block 904. In one example, and as explained below with respect to block 920, emitter point clusters in the set of emitter point clusters are iteratively selected and removed until all of the emitter point clusters have been selected and tested to determine whether their levels of detail are sufficient for shading the receiver point. However, as explained below with respect to the blocks 914 and 916, a particular emitter point cluster that does not have a suitable level of detail may cause additional emitter point clusters to be added to the set of emitter point clusters.

In block 910, an importance weight for the emitter point cluster selected in block 908 is determined. Block 910 may be performed in the same manner as described above with respect to block 408 (FIG. 4). For example, the importance weight may be based on a property associated with the emitter point cluster, such as the luminance of the scene in the direction of the emitter point cluster.

In block 912, a render-quality criterion for the emitter point cluster is determined based on the importance weight for the emitter point cluster. Block 912 may be performed in the same manner as described with respect to block 410 (FIG. 4). For example, the render-quality criterion may be a maximum solid angle required to subtend the emitter point cluster from the receiver point to be shaded.

In block 914, it is determined whether the emitter point cluster satisfies the render-quality criterion from block 912. In the example above using a maximum solid angle as the render-quality criterion, the solid angle from the receiver point that subtends the emitter point cluster is compared to the calculated maximum solid angle. If the solid angle for the emitter point cluster is less than the calculated maximum solid angle, then, in block 918 the emitter point cluster is identified (e.g. flagged) as being an emitter point cluster that may be used to shade the receiver point, which is discussed with respect to block 922.

On the other hand, if the solid angle for the emitter point cluster is greater than the calculated maximum solid angle, then, in block 916, emitter point clusters of a greater level of detail that represent the same emitter points (e.g., emitter point clusters lower in the hierarchy or deeper in the tree) are added to the set of emitter point clusters that may be relevant to shading the receiver point. For example, referring back to FIG. 5, if the emitter point cluster represented by node 509 failed the render-quality criterion, then the emitter point cluster would be removed from the set of emitter point clusters that may be relevant to shading the receiver point and the emitter point clusters represented by nodes 516-520 would be added to the set of emitter point clusters that may be relevant to shading the receiver point. Eventually, these new emitter point clusters having a greater level of detail will be tested against a render-quality criterion. The process can be repeated as necessary to find emitter point clusters with an appropriated level of detail. If no emitter point clusters with a greater level of detail exist (e.g., the leaf nodes of the tree are reached), then the emitter points of the emitter point cluster that failed the render-quality criterion may be flagged to be used for shading the receiver point.

In block 920, it is determined whether all emitter point clusters of the set of emitter point clusters to be used for shading have been tested against the render-quality criterion. If additional emitter point clusters need to be tested, then blocks 908, 910, 912, 914, 916, and 918 are repeated as necessary.

In block 922, the receiver point is shaded using information from the emitter point clusters (and emitter points if emitter point clusters did not provide sufficient levels of detail) that have been identified in block 918 as being suitable for shading the receiver point. In one example, shading a receiver point may be accomplished by accumulating the indication of light (e.g., luminance) from all of the emitter point clusters and emitter points that have been flagged in blocks 914 and 918 as being relevant for the shading of the receiver point.

In block 924, it is determined whether all receiver points that need to be shaded have been shaded. If additional receiver points still need to be shaded, then the blocks of process 900 may be repeated as necessary, as described above. Alternatively, if all of the receiver points that need to be shaded have been shaded, then process 900 is complete.

Figure 10:
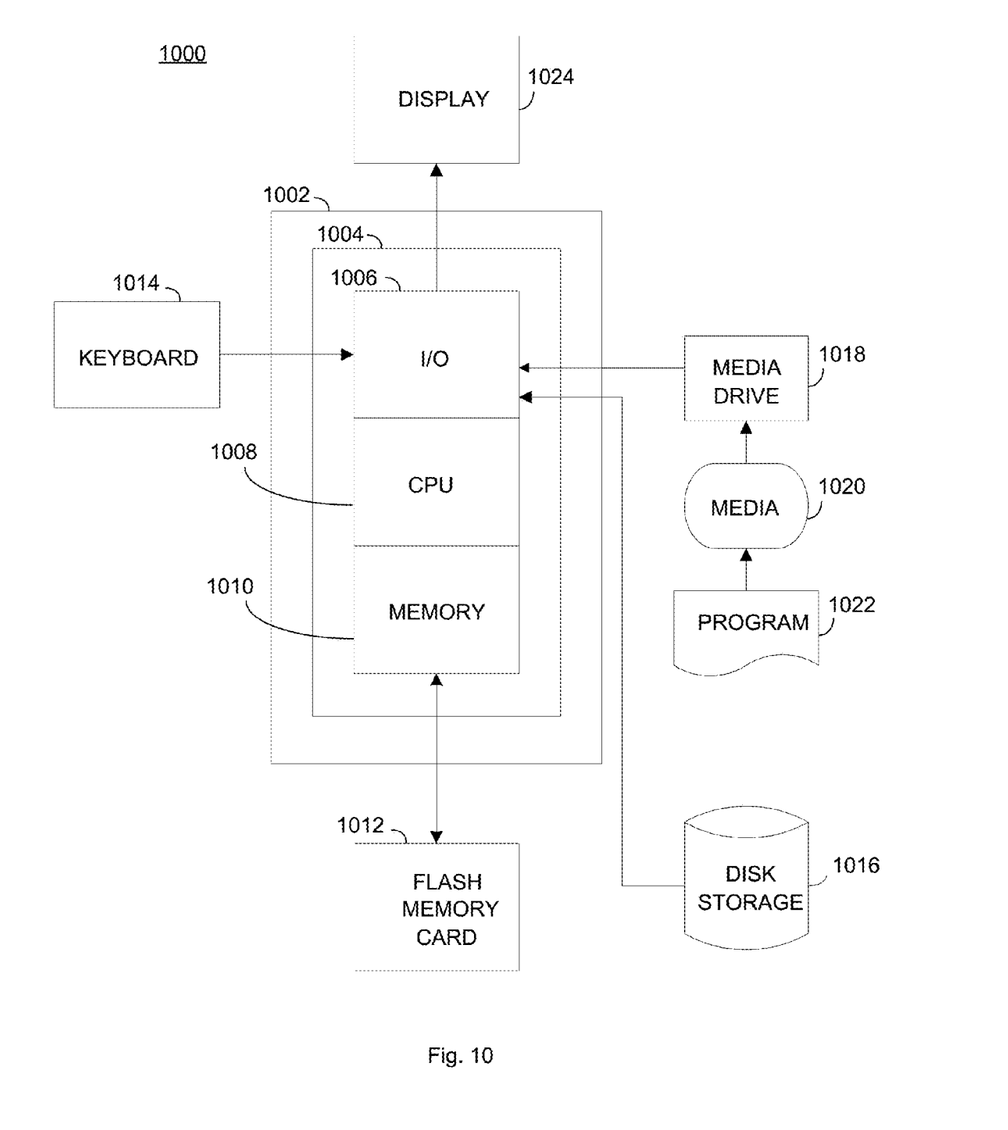
FIG. 10 depicts an exemplary computing system that may be used to implement an exemplary process according to the present disclosure.

FIG. 10 depicts an exemplary computing system 1000 configured to perform any one of the above-described processes. In this context, computing system 1000 may include, for example, a processor, memory, storage, and input/output devices (e.g., monitor, keyboard, disk drive, Internet connection, etc.). However, computing system 1000 may include circuitry or other specialized hardware for carrying out some or all aspects of the processes. In one embodiment, computing system 1000 may be configured as a system that includes one or more units, each of which is configured to carry out some aspects of the processes either in software, hardware, or some combination thereof.

FIG. 10 depicts computing system 1000 with a number of components that may be used to perform the above-described processes. The main system 1002 includes a motherboard 1004 having an I/O section 1006, one or more central processing units ("CPU") 1008, and an in-core memory section 1010, which may have a flash memory card 1012 related to it. The I/O section 1006 is connected to a display 1024, a keyboard 1014, an out-of-core disk storage unit 1016, and a media drive unit 1018. The media drive unit 1018 can read/write a non-transistory computer-readable medium 1020, which can contain programs 1022 and/or data.

At least some values based on the results of the above-described processes can be saved for subsequent use. Additionally, a non-transitory computer-readable medium can be used to store (e.g., tangibly embody) one or more computer programs for performing any one of the above-described processes by means of a computer. The computer program may be written, for example, in a general-purpose programming language (e.g., Pascal, C, C++) or some specialized application-specific language.

Although only certain exemplary embodiments have been described in detail above, those skilled in the art will readily appreciate that many modifications are possible in the exemplary embodiments without materially departing from the novel teachings and advantages of this disclosure. For example, aspects of embodiments disclosed above can be combined in other combinations to form additional embodiments. Accordingly, all such modifications are intended to be included within the scope of this disclosure.

What is claimed is:

1. A computer-implemented method for shading locations for use in rendering a computer-generated scene having one or more objects represented by a point cloud, the method comprising:
    (a) obtaining a hierarchy for the point cloud, wherein the point cloud includes a plurality of emitter points that contain an indication of light emitted from surface elements of the objects in the scene, and wherein the hierarchy has a plurality of clusters of emitter points of the point cloud;
    (b) selecting a receiver point to shade;
    (c) obtaining a desired solid angle;
    (d) selecting a first cluster from the plurality of clusters, wherein the first cluster represents a first set of points in the point cloud, and wherein the solid angle that subtends the first cluster from the receiver point is not greater than the desired solid angle;
    (e) determining an importance weight for the first cluster, wherein the importance weight is based on the luminance of an area of the scene in the direction of the first cluster;
    (f) determining a maximum allowed solid angle based on the importance weight of the first cluster;
    (g) determining whether the solid angle that subtends the first cluster from the receiver point is greater than the maximum allowed solid angle; and
    (h) in response to a determination that the solid angle that subtends the first cluster from the receiver point is not greater than the maximum allowed solid angle, shading the receiver point based on an indication of light emitted from the first cluster.

2. The method of claim 1 further comprising:
    (i) in response to a determination that the solid angle that subtends the first cluster from the receiver point is greater than the maximum allowed solid angle, shading the receiver point based on an indication of light emitted from a second cluster representing a second set of points, wherein the solid angle that subtends the second cluster from the receiver point is not greater than the maximum allowed solid angle.

3. The method of claim 2, wherein the first set of points includes all of the points of the second set of points and at least one additional point.

4. The method of claim 1 further comprising:
    (i) in response to a determination that the solid angle that subtends the first cluster from the receiver point is greater than the maximum allowed solid angle, repeating steps (e)-(h) for a second cluster, wherein the solid angle that subtends the second cluster from the receiver point is not greater than the maximum allowed solid angle, and wherein the second cluster represents a subset of points of the first set of points.

5. The method of claim 1, wherein the hierarchy is a tree structure.

6. The method of claim 1, wherein the importance weight is linearly proportional to the luminance of the area of the scene in the direction of the first cluster.

7. The method of claim 1, wherein the maximum allowed solid angle is a linear function of the importance weight.

8. The method of claim 1, wherein the importance weight is based on a level of reflectance for the area of the scene in the direction of the first cluster.

9. A non-transitory computer-readable storage medium encoded with a computer program for shading locations for use in rendering a computer-generated scene having one or more objects represented by a point cloud, the computer program comprising computer executable instructions for:
    (a) obtaining a hierarchy for the point cloud, wherein the point cloud includes a plurality of emitter points that contain an indication of light emitted from surface elements of the objects in the scene, and wherein the hierarchy has a plurality of clusters of emitter points of the point cloud;
    (b) selecting a receiver point to shade;
    (c) obtaining a desired solid angle;
    (d) selecting a first cluster from the plurality of clusters, wherein the first cluster represents a first set of points in the point cloud, and wherein the solid angle that subtends the first cluster from the receiver point is not greater than the desired solid angle;
    (e) determining an importance weight for the first cluster wherein the importance weight is based on the luminance of an area of the scene in the direction of the first cluster;
    (f) determining a maximum allowed solid angle based on the importance weight of the first cluster;
    (g) determining whether the solid angle that subtends the first cluster from the receiver points is greater than the maximum allowed solid angle; and
    (h) in response to a determination that the solid angle that subtends the first cluster from the receiver point is not greater than the maximum allowed solid angle shading the receiver point based on an indication of light emitted from the first cluster.

10. The non-transitory computer-readable storage medium of claim 9, wherein the computer program further comprises computer executable instructions for:
    (h) in response to a determination that the solid angle that subtends the first cluster from the receiver point is greater than the maximum allowed solid angle, shading the location based on an indication of light emitted from a second cluster representing a second set of points, wherein the solid angle that subtends the second cluster from the receiver point is not greater than the maximum solid angle.

11. The non-transitory computer-readable storage medium of claim 10, wherein the first set of points includes all of the points of the second set of points and at least one additional point.

12. The non-transitory computer-readable storage medium of claim 9, wherein the computer program further comprises computer executable instructions for:
   (i) in response to a determination that the solid angle that subtends the first cluster from the receiver point is greater than the maximum allowed solid angle, repeating steps (e)-(h) for a second cluster, wherein the solid angle that subtends the second cluster from the receiver point is not greater than the maximum allowed solid angle, and wherein the second cluster represents a subset of points of the first set of points.

13. The non-transitory computer-readable storage medium of claim 9, wherein the hierarchy is a tree structure.

14. The non-transitory computer-readable storage medium of claim 9, wherein the importance weight is linearly proportional to the luminance of the area of the scene in the direction of the first cluster.

15. The non-transitory computer-readable storage medium of claim 9, wherein the maximum allowed solid angle is a linear function of the importance weight.

16. The non-transitory computer-readable storage medium of claim 9, wherein the importance weight is based on a level of reflectance of the area of the scene in the direction of the first cluster.

17. An animation system for shading locations for use in rendering a computer-generated scene having one or more objects represented by a point cloud, the system comprising:

at least one processor; and
memory storing instructions, the instructions configured for execution by the at least one processor to cause the at least one processor to:
   obtain a hierarchy for the point cloud, wherein the point cloud includes a plurality of emitter points that contain an indication of light emitted from surface elements of the objects in the scene, and wherein the hierarchy has a plurality of clusters of emitter points of the point cloud;
   select a receiver point to shade;
   obtain a desired solid angle;
   select a first cluster from the plurality of clusters, wherein the first cluster represents a first set of points in the point cloud and wherein the solid angle that subtends the first cluster from the location to shade is not greater than the desired solid angle;
   determine an importance weight for the first cluster, wherein the importance weight is based on the luminance of an area of the scene in the direction of the first cluster;
   determine a maximum allowed solid angle for the first cluster based on the importance weight of the first cluster;
   determine whether the solid angle that subtends the first cluster from the receiver point is greater than the maximum allowed solid angle; and
   in response to a determination that the solid angle that subtends the first cluster from the receiver point is not greater than the maximum allowed solid angle, shading the receiver point based on an indication of light emitted from the first cluster.

* * * * *